US005851248A

United States Patent [19]

Wilson et al.

[11] Patent Number: 5,851,248

[45] Date of Patent: Dec. 22, 1998

[54] FILTER CARTRIDGE ASSEMBLY FOR POWDER COATING BOOTH AND COLLECTION SYSTEM

[75] Inventors: Timothy E. Wilson, Amherst; Donald Leonard Urig, Elyria; Michael A. Reighard, Avon Lake; David L. Ray, North Olmsted; Dean A. Koch, Amherst; Jeffrey R. Shutic, Wakeman; Christopher Hart Chandler, North Ridgeville; Robert J. Holland, Avon, all of Ohio; Andreas Kress, Hoesbach-Bhf., Germany

[73] Assignee: Nordson Corporation, Westlake, Ohio

[21] Appl. No.: 567,189

[22] Filed: Dec. 5, 1995

Related U.S. Application Data

[63] Continuation of Ser. No. 136,348, Oct. 14, 1993, abandoned, which is a continuation-in-part of Ser. No. 955,574, Oct. 2, 1992, abandoned.

[51] Int. Cl.[6] .......... B01D 39/00; B01D 35/30

[52] U.S. Cl. .......... 55/357; 55/378; 210/237; 210/470

[58] Field of Search .......... 55/490, 491, 492, 55/498, 502, 504, 506, 508, DIG. 31, DIG. 46, 357, 378, 379; 210/470, 232, 237

[56] References Cited

U.S. PATENT DOCUMENTS

| | | | |
|---|---|---|---|
| 3,178,779 | 4/1965 | Clark et al. | 49/477.1 |
| 3,960,527 | 6/1976 | Goetti | 55/269 |
| 4,129,429 | 12/1978 | Humbert, Jr. et al. | 55/484 |
| 4,218,227 | 8/1980 | Frey | 55/302 |
| 4,277,260 | 7/1981 | Browning | 118/326 |
| 4,314,832 | 2/1982 | Fox | 55/510 |
| 4,354,451 | 10/1982 | Vohringer et al. | 454/53 |
| 4,378,728 | 4/1983 | Berkmann | 55/310 |
| 4,409,009 | 10/1983 | Lissy | 55/302 |
| 4,490,253 | 12/1984 | Tafara | 55/357 |
| 4,498,913 | 2/1985 | Tank et al. | 55/356 |
| 4,545,324 | 10/1985 | Browning | 118/634 |
| 4,561,380 | 12/1985 | Mulder et al. | 118/688 |
| 4,590,884 | 5/1986 | Kreeger et al. | 55/356 |
| 4,662,309 | 5/1987 | Mulder | 55/356 |
| 4,723,505 | 2/1988 | Wilson et al. | 55/341.7 |
| 4,932,354 | 6/1990 | Kistner | 118/305 |
| 5,022,344 | 6/1991 | Kundis | 118/56 |
| 5,056,460 | 10/1991 | Vohringer | 55/DIG. 46 |
| 5,209,498 | 5/1993 | Colin | 277/34 |

FOREIGN PATENT DOCUMENTS

| | | |
|---|---|---|
| 92 07 787 U | 10/1992 | Germany . |
| 217378 | 8/1986 | New Zealand . |

OTHER PUBLICATIONS

Installation and Operation Manual for Torit Filter Cartridge System Collectors, published by Torit of St. Paul, Minnesota, 1978, pp.5 and 9.

*Primary Examiner*—David A. Simmons
*Assistant Examiner*—Calvin Padgett
*Attorney, Agent, or Firm*—Calfee, Halter & Griswold LLP

[57] ABSTRACT

Apparatus and methods for aligning a powder spray canopy of a powder coating booth with a fan plenum assembly so that a powder collector can be quickly aligned and simultaneously sealed to both the powder spray canopy and the fan plenum. The invention also relates to an improved filter cartridge and filter cartridge mounting assembly which allows for quick and easy mounting and dismounting of filter cartridges to the powder collector.

12 Claims, 11 Drawing Sheets

FILTER CARTRIDGE ASSEMBLY FOR POWDER COATING BOOTH AND COLLECTION SYSTEM

This is a continuation of U.S. application Ser. No. 08/136,348, filed Oct. 14, 1993, now abandoned, which is a continuation-in-part of U.S. application Ser. No. 07/955,574, filed Oct. 2, 1992, now abandoned.

FIELD OF THE INVENTION

This invention relates to the field of powder coating booths and collection systems for electrostatic application of powder coating materials. More particularly, the invention relates to an apparatus which aligns a powder spray canopy to a fan plenum so that a powder collector can be quickly aligned and securely sealed to both the powder spray canopy and the fan plenum. The invention also relates to an improved filter cartridge mounting assembly which enables filter cartridges to be quickly and easily mounted to and dismounted from a powder collector.

BACKGROUND OF THE INVENTION

Powder booths for electrostatic application of powder materials to articles typically include a spray booth and a conveyor for carrying the article to be sprayed through the spray booth. Spray guns mounted in the booth and connected to a source of air entrained powder, such as a powder feed hopper and powder pump, spray electrostatically charged powder material onto the electrically grounded articles carried by the conveyor through the booth. An important feature of the powder booths is the apparatus for collecting oversprayed powder, that is the powder which does not adhere to the articles being powder coated, and returning the oversprayed powder to the spray guns. Typically, an exhaust system including a fan plenum assembly creates a negative pressure in the booth by drawing air through the booth to be mixed with the oversprayed powder. Then the mixture of air and oversprayed powder is drawn into the powder collector where the air is separated from the powder prior to exhausting the cleaned air to atmosphere. The separated oversprayed powder is typically collected at the bottom of the powder collector and recirculated to the powder feed hopper for return to the spray guns.

When the mixture of air and oversprayed powder flows from the spray booth into the powder collector, some of the powder falls and collects at the bottom of the collector. The remainder collects on the outer surface of the one or more filters which separates the mixture of air and oversprayed powder. The powder collected on the filters can be removed by techniques including air pulsing, as discussed in U.S. Pat. No. 4,662,309, assigned to Nordson Corp., the assignee of the present invention, which patent is incorporated in its entirety herein.

Typically, interchangeable powder collectors are designed so that they can be quickly and easily moved into and out of position under or adjacent the spray booth so that a different powder collector can be used for each color powder being sprayed. The powder collectors have an inlet opening adapted to be aligned with and securely sealed against a powder exhaust opening in the canopy of the spray booth. A secure, airtight seal between the inlet opening of the powder collector and the powder exhaust opening is important to prevent the escape of spray powder to the surrounding atmosphere. Further, the powder collectors have an exhaust opening adapted to be aligned with and sealed against the air inlet opening of an exhaust plenum assembly. The integrity of the seal between the latter exhaust and air inlet openings insures that the negative pressure developed by the exhaust fan in the fan plenum pulls air solely into the spray booth to mix with oversprayed powder and efficiently draws the mixture of air and oversprayed powder into the powder collector. The airtight seal between the previously mentioned exhaust and air inlet openings is also needed to prevent leakage of the cleaning air pulses directed from the plenum into the powder collector to clean the filters. Such leakage would reduce the effective cleaning of the filters.

In the past, to set up powder booth spray systems with free standing, independently supported fan plenums, such as is shown in U.S. Pat. No. 4,498,913, the spray booth was initially aligned with respect to the conveyor line extending therethrough. Typically the spray booth had a base with six or eight legs, each having an adjustable foot, e.g., a caster. The aligning of the spray booth was labor intensive and time consuming particularly where there existed irregularities in the work floor or surface on which the booth was supported.

Next, the air inlet port of the exhaust fan plenum was aligned with respect to the powder exhaust opening in the spray booth canopy so that when the powder collector was moved into place, its inlet opening could be aligned with and sealed against the powder exhaust opening in the canopy while its air exhaust outlet was simultaneously aligned with and sealed against the air inlet opening of the exhaust plenum assembly. This typically required time consuming, labor intensive adjustment of the casters on the legs, typically four, supporting the fan plenum. Finally, the casters on the legs of the powder collector were adjusted to securely seal the collector against both the booth and the air plenum.

In a different type of prior art booth, as illustrated in U.S. Pat. No. 4,590,884, the spray booth was mounted on rollers to enable the booth to be rolled into and out of alignment with the conveyor and/or the powder collector. A fan plenum was supported above the floor and had rollers which were rotatable over a pair of floor mounted side rails located on either side of the plenum. While the fan plenum could be permanently secured to the spray booth, the mounting system of the U.S. Pat. No. 4,590,884 patent was deficient because it could not be adjusted with respect to the spray booth but instead relied on side rails being properly aligned and built into the floor, an expensive and limiting requirement.

In another prior art booth design, as illustrated in U.S. Pat. Nos. 4,277,260 and 4,378,728, the fan section was structurally coupled to the spray booth. In this case, since the fan plenum was quite heavy and cantilevered from the booth, the spray booth canopy had to be constructed of heavy weight metal to support the fan plenum. This was particularly so because, in addition to the fan section being heavy, it also generated a significant amount of vibration, especially from the valve manifold used to pulse clean the filter cartridges. Besides being expensive to manufacture and cumbersome to move into place, a spray booth canopy of heavy weight metal construction tended to attract the powder coating material which then collected on the booth walls rather than the article which was being powder coated.

In U.S. Pat. No. 4,354,451, the fan unit was positioned above the top of the spray booth and mounted either directly to the spray booth or mounted independently of the spray booth. In both cases, the system was deficient. First, the powder collector was very tall and awkward to safely maneuver across the plant floor, especially since it was frequently replaced, i.e., for every change in color. Second, the spray booth was constructed of heavy weight metal in order to support the fan unit.

Another common problem in the prior art relates to the apparatus used to secure the air filters within the powder collector. As illustrated in U.S. Pat. No. 4,218,277, some air filter designs had a bottom plate with a hole. A central tie rod was inserted through the hole in the bottom plate and secured thereto by a threaded nut. This design was deficient because over time the hole through the bottom plate provided a path for unfiltered powder to leak into the clean air fan plenum. When particles of powder escaped into the clean air fan plenum, any downstream filter, specifically a final filter which was designed to filter extremely small sized particles, quickly clogged and caused a shutdown of the entire powder coating operation. Further, the filter illustrated in the U.S. Pat. No. 4,218,277 patent was difficult to mount in the collector. In many instances, the installation of this type of filter required two installers, one on the exhaust side and the other on the inlet side of the powder collector.

OBJECTS AND SUMMARY OF THE INVENTION

It is an object of the present invention to align a powder spray canopy with a fan plenum so that a powder collector can be quickly aligned and securely sealed to both the powder spray canopy and the fan plenum to obviate the problems and limitations of the prior art systems.

It is a further object of the present invention to provide an improved filter cartridge mounting assembly which allows for quick and easy mounting and dismounting of filter cartridges in the powder collector.

It is a still further object of the present invention to provide structural components for compression mounting vertically oriented, filter cartridges so that they are easily installed with a simple and reliable seal.

It is a yet further object of the present invention to provide an improved seal between the fan plenum and the powder collector.

Yet another object is to provide an improved booth design wherein the fan plenum is supported by the booth in such a way that the spray canopy can be constructed of lightweight, plastic material.

In accordance with the invention, there is provided a powder coating system comprising a base with a fan support secured thereto. The fan support is adapted to support a fan plenum assembly having an inlet opening in a bottom wall thereof. A spray canopy of a powder spray booth having an exhaust opening in a side wall is secured to the base and to the fan support. A powder collector having an inlet opening in a front wall and an exhaust opening in a top plate is adapted to seal against the canopy and the fan plenum assembly so that the exhaust opening in the side wall of the canopy seals against the inlet opening of the powder collector and the inlet opening of the fan plenum assembly seals against the exhaust opening of the powder collector.

Also in accordance with the invention, a leveling means is provided on the base to simultaneously level the fan plenum assembly and the spray canopy. A leveling means on the powder collector simultaneously levels the powder collector with respect to the fan plenum assembly and the canopy whereby the inlet opening of the powder collector is aligned for sealing to the exhaust opening of the canopy and the exhaust opening of the powder collector is aligned for sealing against the inlet opening of the fan plenum assembly.

The base includes two substantially parallel beams having legs at each end and a substantially rectangular table shaped section secured to the beams. The table shaped section has a central section secured to the parallel beams and opposite first and second end sections extending from opposite ends of the central section and cantilevered outward from the parallel beams. The spray canopy is secured on the parallel beams so that the beams project outward from one side of the table section and are secured to the fan support.

According to the invention, a seal is disposed between the fan plenum assembly and the powder collector to seal the exhaust opening of the powder collector against the inlet opening of the fan plenum assembly. The seal includes a bracket and a pneumatic seal member securely gripped therein. The seal member is constructed of an elastomeric material with a cross section including a top surface, two side walls, a bottom surface with an upstanding rib, and a hollow inner chamber. The seal member is normally in a collapsed, deflated state with the upstanding rib in a first position closer to the top surface. The seal member can be expanded from its deflated state to an inflated state where the upstanding rib is in a second position further away from the top surface than in the first position. The seal helps to secure the powder collector in position. Also, a second seal means seals an opening through a wall in the fan support against the inlet opening in the powder collector.

Further in accordance with the invention, a cartridge mount assembly comprises a hollow cartridge having a bottom plate with an internally threaded boss secured to the inside wall of the bottom end of the cartridge. A tie rod extending through the cartridge is threadably engaged at one end to the threaded boss and at an opposite end to a support assembly. The support assembly is supported in an opening within a powder collector so that the cartridge is secured against a top plate of the powder collector. A handle extends through the tie rod to thread the tie rod into the threaded boss before the cartridge is mounted into the collector. A spider assembly has a center bushing and a plurality of truss arms which are affixed thereto and project radially outward therefrom. The outer ends of the truss arms are notched to rest against the periphery of the opening in the top wall of the powder collector and support the cartridge therefrom. Notches in the top plate engage the truss arms and prevent rotational movement of the spider assembly. A centering bracket on the tie rod engages the interior wall of the cartridge and maintains the longitudinal centerline through the tie rod coincident with the centerline through the cartridge to protect the threaded boss from torque caused by a misaligned tie rod, particularly during installation. The handle is used to pull the tie rod up through the center bushing so that a nut can be threaded onto the upper end of the tie rod to mount the cartridge in the collector. A roll pin extends through the tie rod to engage the bushing and prevent the tie rod from being unthreaded from the boss when the cartridge is removed from the powder collector. A single installer can both install and remove the cartridge.

In a second embodiment, another filter cartridge mount assembly and method of mounting a filter cartridge having a bottom plate with an internally threaded boss to an opening within a powder collector is disclosed. A support assembly includes a center bushing with a cross slot therethrough and a plurality of truss arms affixed to the bushing and projecting radially outward therefrom to removably attach the support assembly to the periphery of the opening through the top wall of the powder collector. A tie rod, having a handle therethrough, extends through the cartridge and is threadably engaged at one end to the threaded boss and at the opposite end to the support assembly. A centering bracket which is securely positioned within the cartridge has a cylindrical tube into which the tie rod is inserted. The tie rod is secured to the support assembly so that the center bushing of the support assembly abuts against the cylindrical tube of the centering bracket whereby a gasket disposed between the filter cartridge and the opening within the powder collector is compressed a predetermined amount to form an air tight seal between the filter cartridge and the powder collector.

BRIEF DESCRIPTION OF THE DRAWINGS

The structure, operation, and advantages of the presently preferred embodiment of the invention will become further apparent upon consideration of the following description taken in conjunction with the accompanying drawings, wherein.

DETAILED DESCRIPTION OF THE INVENTION

Figure 1:
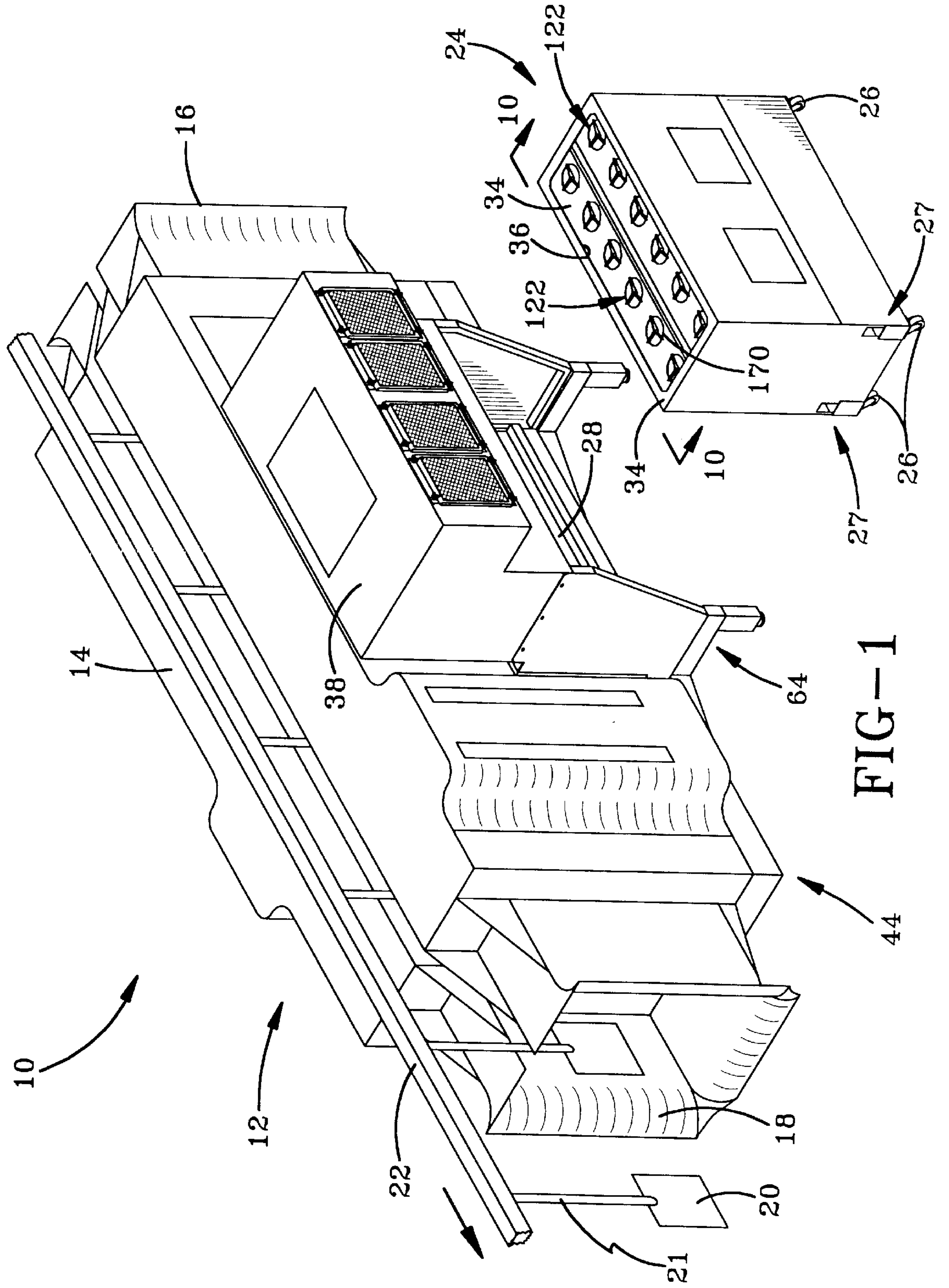
FIG. 1 is a perspective view of a base structure supporting a fan plenum and a spray booth in alignment with each other and a conveyor, and showing a powder collector prior to being positioned and sealed against the spray booth and the fan plenum, in accordance with the invention.
Figure 2:
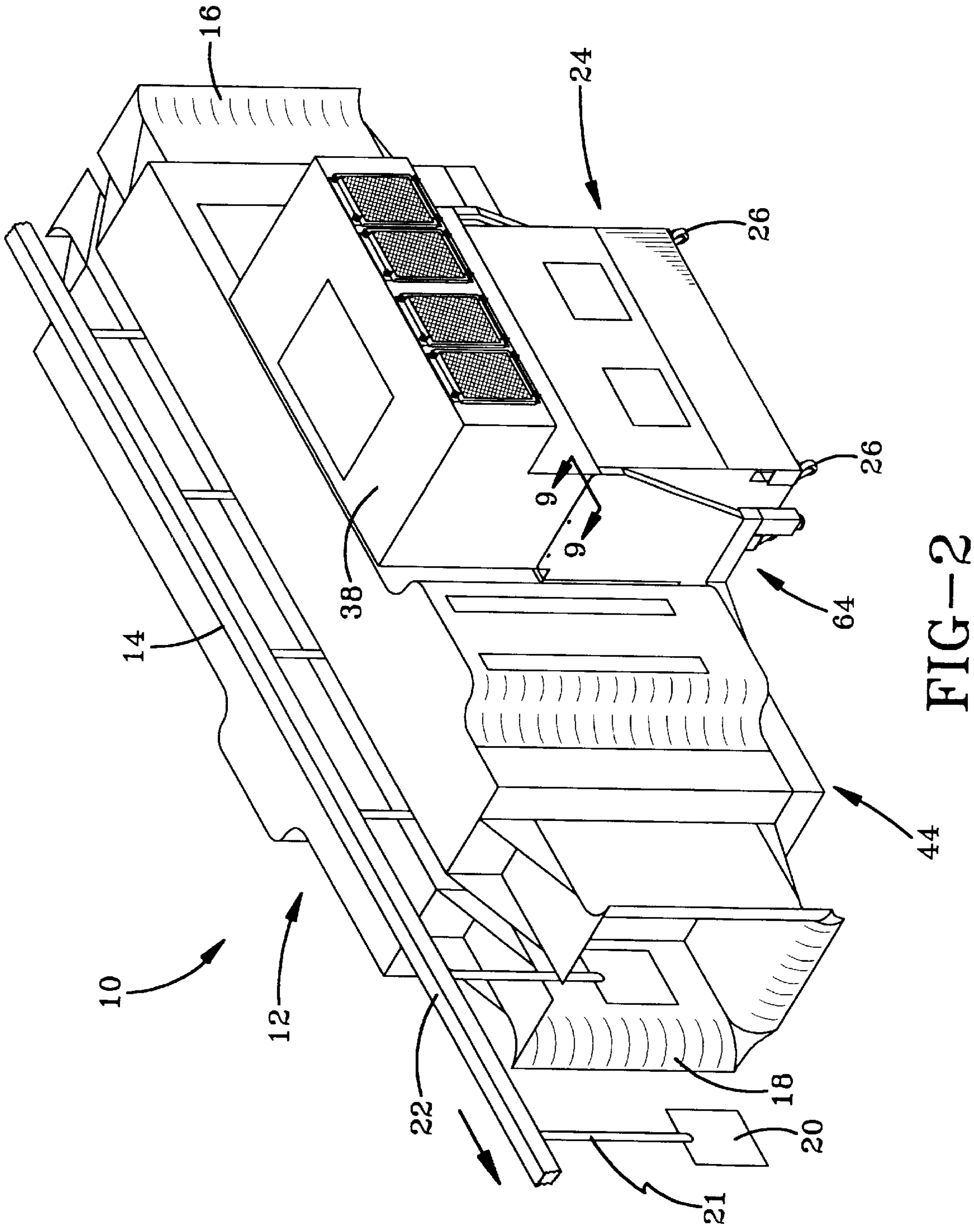
FIG. 2 is a perspective view of the base structure supporting the fan plenum and spray booth in alignment with each other and a powder collector positioned and sealed against both the spray booth and the fan plenum.

Referring to FIGS. 1 and 2, a powder coating system 10, intended for use as a powder coating booth 12 for applying powder coating material on a production line basis, includes provision for automatic recovery and recirculation of the oversprayed powder in the system. Booth 12 is of a generally conventional design and includes a spray canopy 14 having entry and exit vestibules 16 and 18, respectively, at each end thereof through which the article or part 20 to be coated can be transported. Typically in such equipment, the article 20 to be coated is hung by a hook 21 from a conveyor system 22 to move slowly through spray booth 12 so that the part is sprayed with one or more spray guns through an opening (not shown) in the side of the canopy opposite the powder collector 24.

Figure 9:
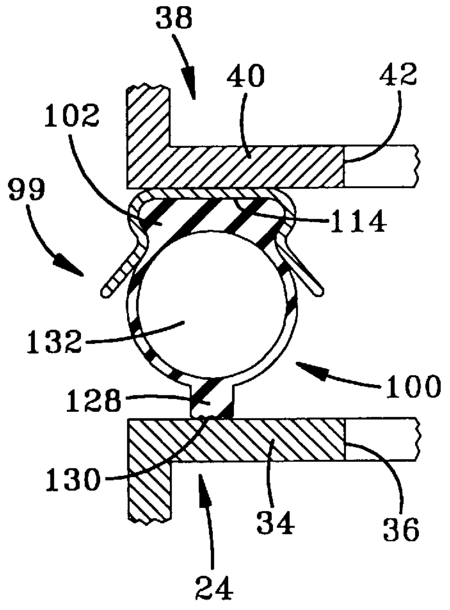
FIG. 9 is a view taken along line 9—9 of FIG. 2 illustrating the seal assembly in the inflated, expanded position between the powder collector and the fan plenum.
Figure 10:
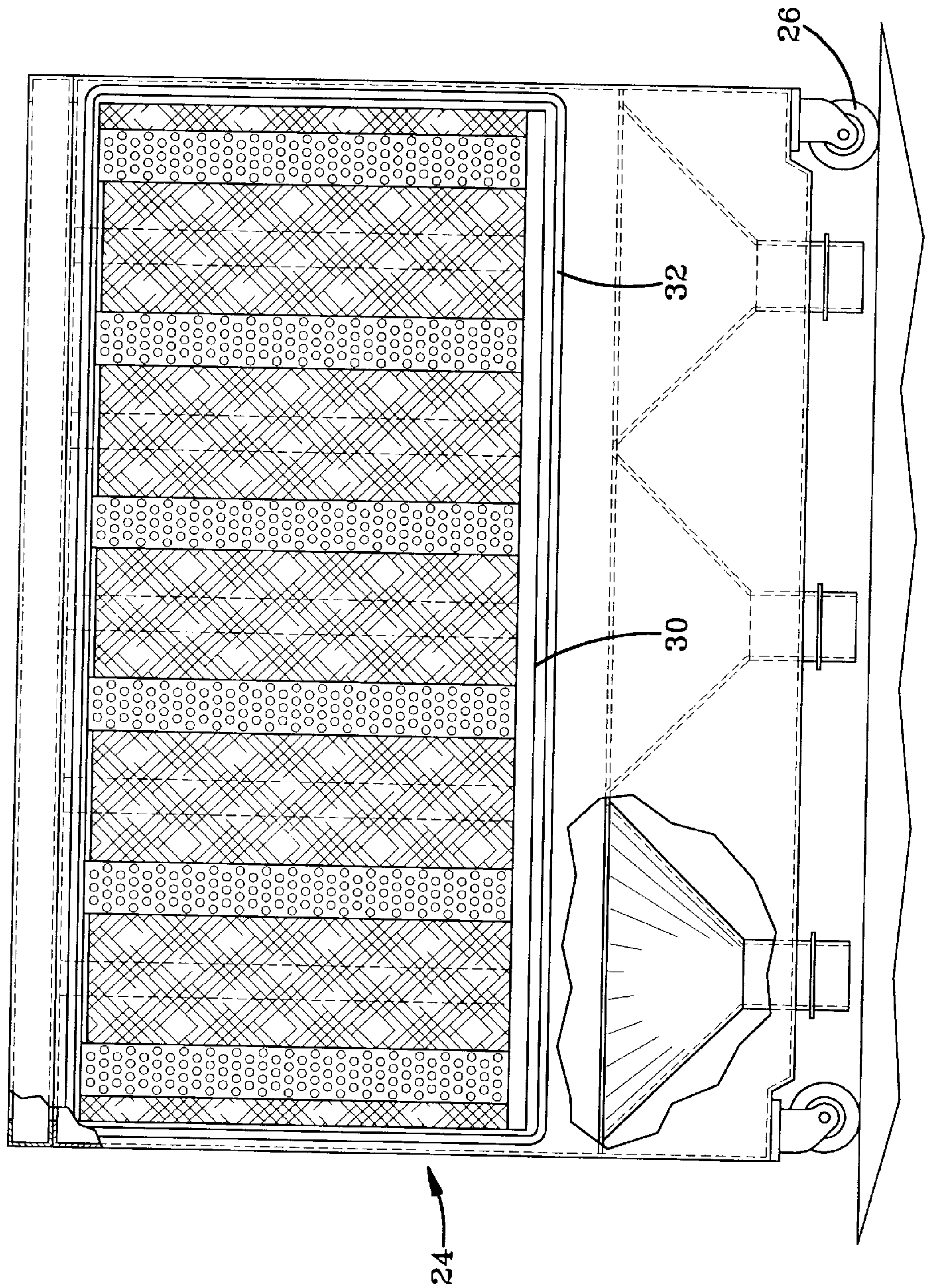
FIG. 10 is a view taken along line 10—10 of FIG. 1 illustrating the inlet opening to the powder collector.

Powder collector 24, as illustrated in FIGS. 1, 2 and 10, is mounted on wheels 26. The wheels 26 include leveling means 27, which are preferably vertically adjustable casters, to level the powder collector as required for the particular support surface or floor conditions. The collector 24, during operation of system 10, is located adjacent an exhaust opening 28 in a side wall of canopy 14. The powder collector, best shown in FIG. 10, has an inlet opening 30 in a side wall thereof with a seal 32, preferably "D" shaped in cross section, thereabout. The inlet opening 30 is adapted to mate with canopy exhaust opening 28, as discussed below. A top plate 34 of the collector, as illustrated in FIG. 1, has an exhaust opening 36 which fits under a fan plenum assembly 38 and is sealed against a bottom wall portion 40 of fan plenum 38, disposed about an inlet opening 42, as illustrated in FIG. 9 and discussed in more detail below.

Figure 3:
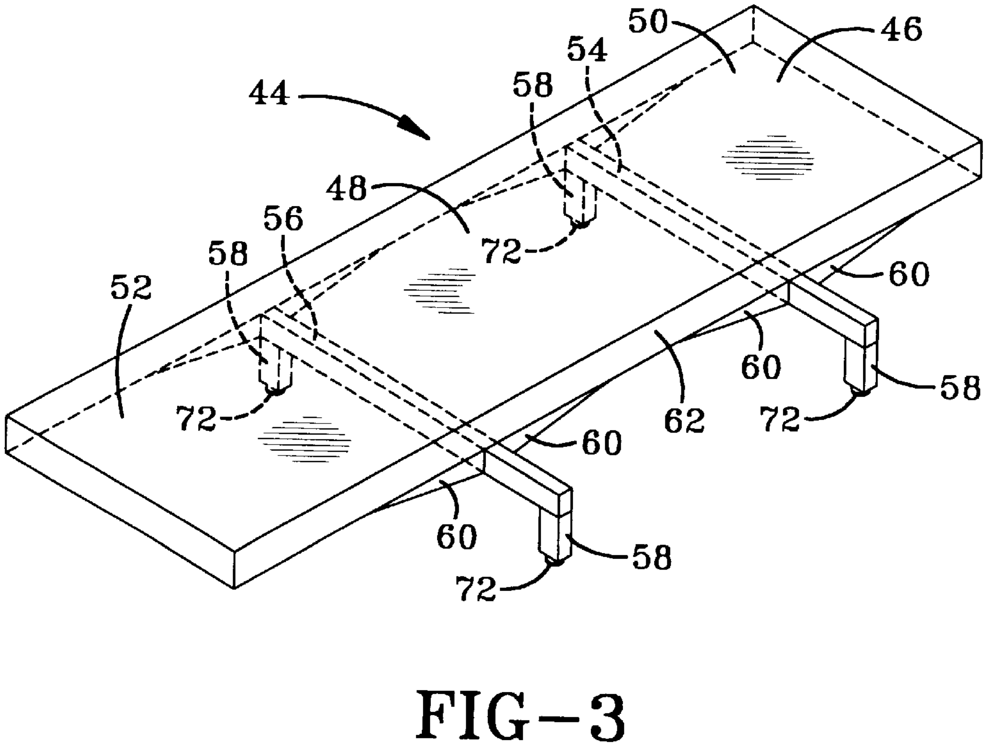
FIG. 3 is a perspective view of the base for the spray booth and the fan plenum of the powder coating system illustrated in FIG. 1.
Figure 5:
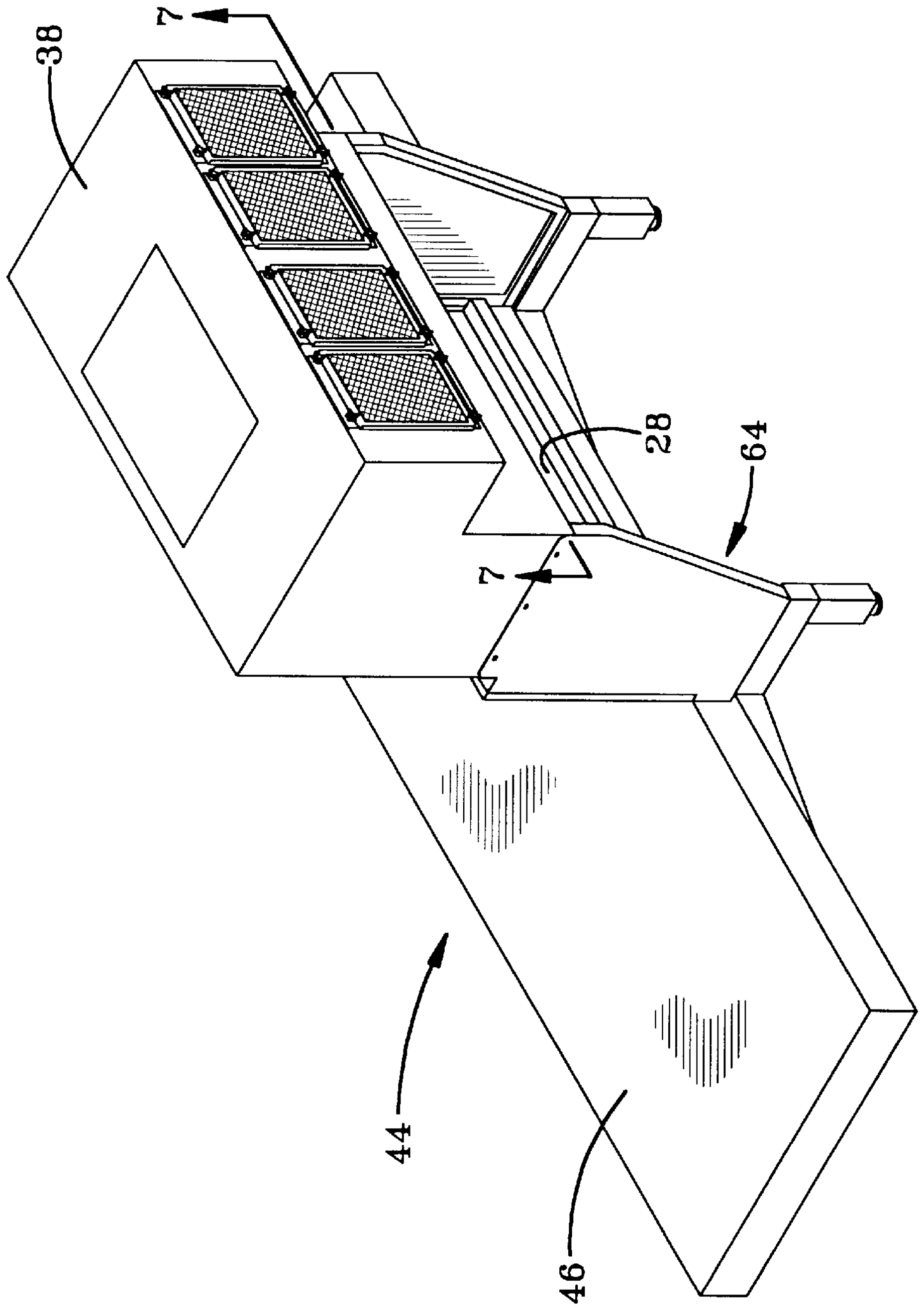
FIG. 5 is a perspective view of the base and fan plenum support structure, as illustrated in FIG. 2, with the fan plenum mounted to the fan assembly support structure.

A principle feature of this invention is the construction of a base 44 which enables the canopy 14 to be automatically and properly aligned with respect to the fan plenum assembly 38. This alignment, in turn, enables a powder collector 24 to be moved into and out of position and quickly aligned and securely sealed to both the exhaust opening 28 of powder spray canopy 14 and inlet opening 42 of the fan plenum 38. The base 44, as illustrated in FIG. 3, includes a rectangular table 46 which forms the inner floor of spray booth 12. Table 46 has a central section 48 and opposite end sections 50 and 52 cantilevered outward from opposite ends of central section 48. Table 46 is supported on two substantially parallel beams 54 and 56 which extend transversely to the length of the table and have leg elements 58 at opposite ends. Beams 54 and 56, which are positioned under the intersections of the central section 48 and the opposite end sections 50 and 52, are secured to the table by conventional means such as welding. Triangular braces 60, secured to the underside of table 46 and to beams 54, 36, stiffen the base to insure its ability to provide solid support for canopy 14 and fan plenum assembly 38 secured thereto. The parallel beams 54 and 56 extend outward from one side 62 of table 46 and form a base to which a fan support 64 (See FIG. 4) is secured.

Leveling means 72 are provided on base 44 to simultaneously level the fan plenum assembly 38 and canopy 14, as discussed in more detail below. Leveling means 72 includes vertically adjustable feet 72 at the bottom of legs 58.

Figure 4:
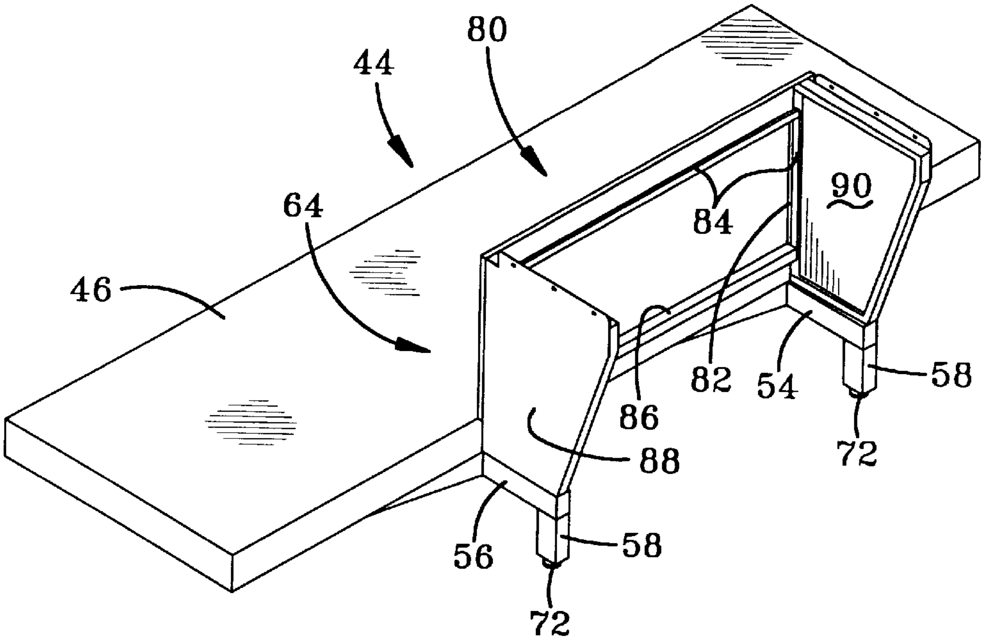
FIG. 4 is a perspective view of the base illustrated in FIG. 3 with the fan plenum support structure mounted thereto.
Figure 6:
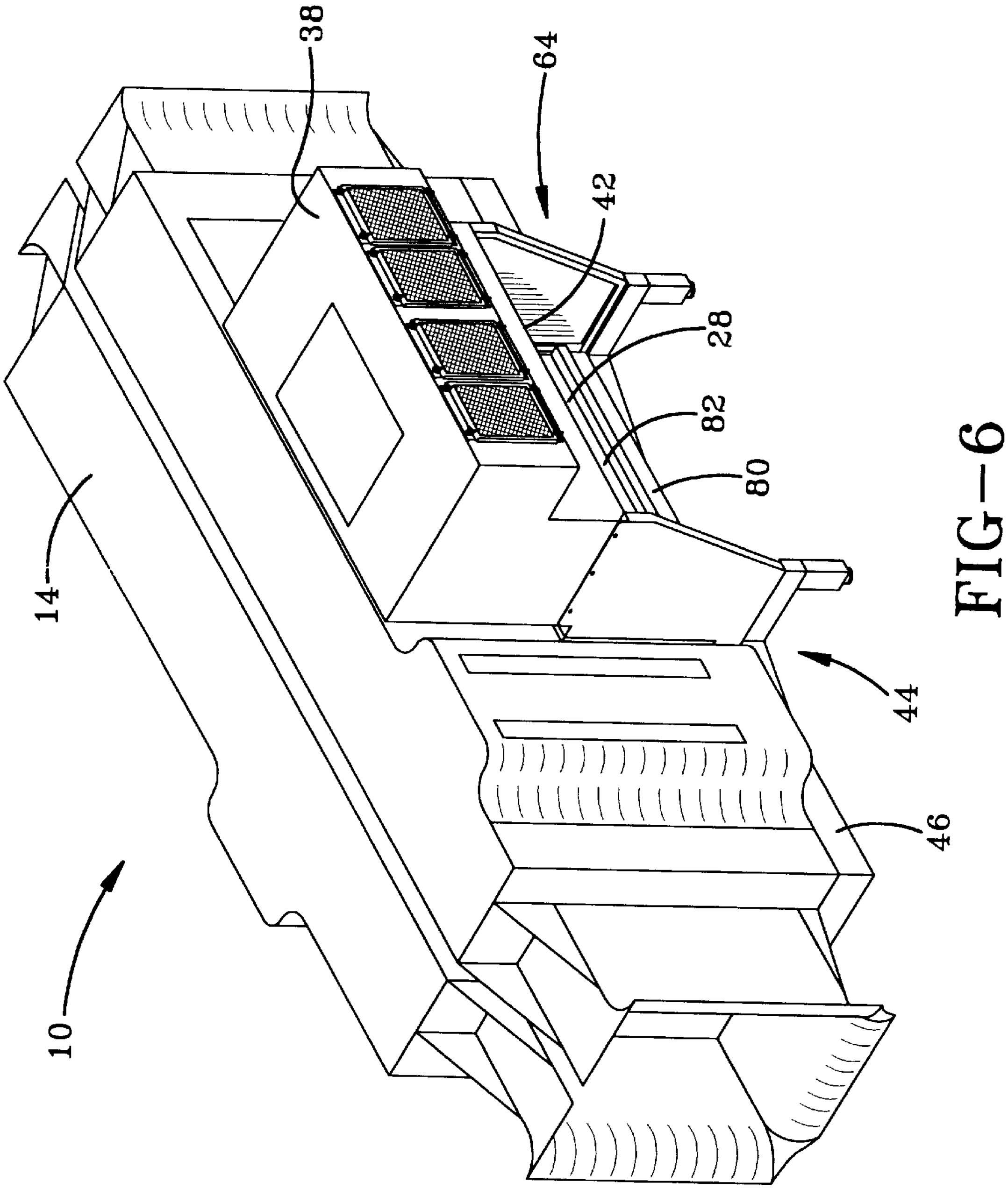
FIG. 6 is a perspective view of the base and fan plenum support structure supporting the fan plenum, as illustrated in FIG. 5, and a canopy secured to the base assembly in alignment with the fan plenum.

Fan support 64, as illustrated in FIG. 4, has a front wall 80 with an opening 82 that is adapted to mate with the exhaust opening 28 (See FIG. 1) of canopy 14. A rectangular frame 84 around opening 82 provides a flat surface against which the "D" shaped seal 32 of powder collector 24 is sealed, as discussed below. A plate 86, secured along the bottom edge of opening 82, is level with table 46. Plate 86 extends into the inlet opening 30 of collector 24 so that any powder which builds up on the inner booth floor can be easily removed by simply being swept into collector 24. Fan support 64 has two parallel side walls 88 and 90 secured to and extending substantially perpendicular to front wall 80. The lower surfaces of side walls 88 and 90 are secured, by conventional means such as welding or bolts, to the upper surface of the portions of the parallel beams 54 and 56 which extend outwardly from side 62 of table 46. The upper surfaces of side walls 80 and 90 are perpendicular to frame 84 and provide a support surface on which the bottom of fan plenum assembly 38 is attached by conventional means such as nuts and bolts, as illustrated in FIG. 6.

An important feature of this invention relates to the ability of fan support 64 to maintain a perpendicular relationship with the opening 82 through front wall 80 of fan support 64 and inlet opening 42 of fan plenum assembly 38. This relationship is needed to enable both inlet opening 30 and exhaust opening 36 of powder collector 24, which are perpendicular to one another, to be quickly and easily aligned with and securely sealed to both opening 82 through front wall 80 of fan support 64 and inlet opening 42 of fan plenum assembly 38. After canopy 14 is securely mounted to table 46, the side wall of the canopy is secured to front wall 80 of fan support 64 so that exhaust opening 28 is immovably aligned with opening 82. Since the inlet opening of fan plenum assembly 38 is securely mounted to the top surface of sidewalls 88 and 90, which in turn are perpendicular to the front wall 80, the inlet opening of fan plenum assembly 38 is automatically aligned to be perpendicular with the opening 82 in the side wall of fan support 64.

By establishing a perpendicular relationship between the inlet opening 42 of fan plenum assembly 38 and the inlet opening 82 through the front wall of fan support 64, the powder collector 24 can quickly be rolled into position, as illustrated in FIG. 2, and simultaneously aligned with respect to canopy 14 and fan plenum assembly 38 so that a secure, air tight seal can be achieved. That is, both inlet and exhaust openings 30 and 36, respectively, of powder collector 24 are located against fan support opening 82 and fan plenum inlet opening 42, respectively, so that an air tight seal can be quickly and easily achieved, as discussed in more detail below. An air tight seal is very important to the proper functioning of the powder coating system 10 because it insures that all of the air entrained powder is drawn from powder coating booth 12 into powder collector 24 and fan plenum assembly 38 without escaping into the surrounding environment.

Another aspect of the invention relates to fan plenum assembly 38 being supported by the base 44 instead of canopy 14, as was often the case in the prior art. This enables the canopy to be constructed of a lightweight, non-metallic material, such as for example a plastic like polypropylene. One advantage of a plastic canopy is that the powder coating material does not have an electrical attraction to the plastic and does not tend to collect on the inner surface of canopy 14 as was the case with a canopy constructed of metal. This is particularly important when the powder color is changed and the entire system must be cleaned before a different powder color can be sprayed. Further, canopy 14 can be constructed from a translucent material which provides improved lighting inside the spray booth to better enable a system operator to monitor the operation of the system. Further, a canopy constructed of a plastic material is lighter in weight than metal construction and more manageable to assemble and lower in cost to manufacture.

Referring to FIG. 10, there is illustrated the front wall of powder collector 24 which has inlet opening 30. A seal means 32, typically comprising an elastomeric seal with a "D" shaped cross section, is disposed around inlet opening 30. When the powder collector is in place against canopy 14, as illustrated in FIG. 2, conventional latches attached to fan support 64, not shown, enable an operator to easily pull collector 24 against the front wall 80 of fan support 64 and tightly compress seal 32 against the frame 84 to form an air tight seal between the rear wall of canopy 14 and the inlet opening 30 of powder collector 24.

Figure 7:
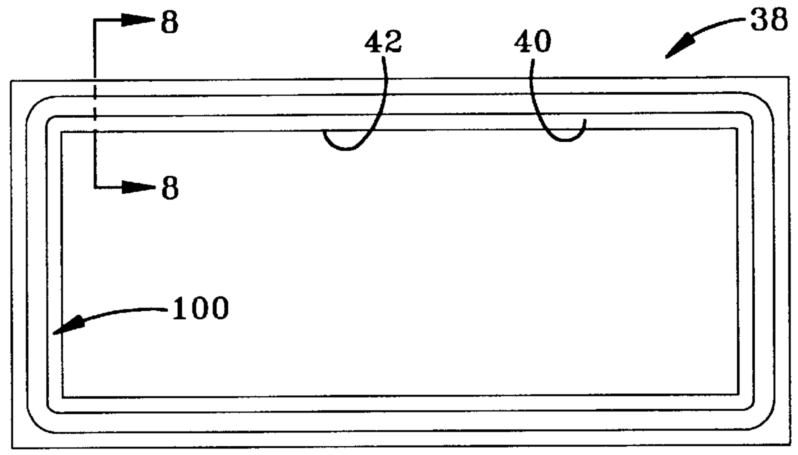
FIG. 7 is a view taken along line 7—7 of FIG. 5 illustrating the retractable seal assembly.
Figure 8:
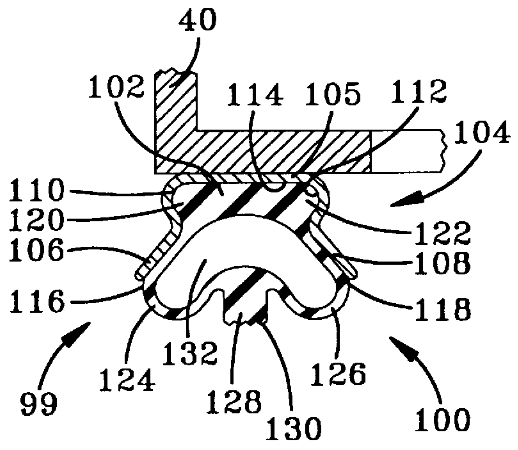
FIG. 8 is a view taken along line 8—8 of FIG. 7 illustrating the seal assembly in its normal deflated, retracted position.

Another important feature of the present invention relates to a seal means 99 including a seal assembly 100 disposed about the inlet opening 42 in bottom 40 of fan plenum assembly 38, as illustrated in FIGS. 7, 8 and 9. The seal assembly 100 includes a retractable, pneumatic seal member 102 secured in a bracket or extrusion 104. Extrusion 104 has an upper wall 105 which is secured to bottom wall 40 by any conventional means such as spot welding. Oppositely disposed, bracket side walls 106 and 108, extending downward from upper wall 105, converge inward toward each other and then turn outward to form oppositely disposed curved recesses 110 and 112 which grip the top edges of seal member 102. The seal member 102 is preferably constructed of an elastomeric material. In the deflated, retracted condition as illustrated in FIG. 8, the cross section of seal member 102 has an upper surface 114 and two side walls 116 and 118. Side walls 116 and 118 project downward from the upper surface 114 and initially converge inward to form shoulders 120 and 122. Then, side walls 116 and 118 diverge outward to form inwardly curved troughs and lower outwardly rounded corners 124 and 126 which intersect at a rib 128. Preferably, rib 128 has a jagged, outwardly facing surface 130. The seal member 102 also has a hollow inner chamber 132.

As illustrated in FIG. 9, when seal member 102 is inflated with air into its expanded condition, the hollow inner chamber forms a substantially circular cross section which forces rib 128 outward away from bottom surface 114. After the powder collector 24 is in place under fan plenum 38, and seal member 102 is inflated into the expanded condition, the surface 130 of rib 128 compresses against top plate 34 of collector 24 and forms an air tight seal around powder collector exhaust opening 36 and fan plenum inlet opening 42.

When the seal assembly 100 is in the retracted position shown in FIG. 8, powder collector 24 can be moved into or out of position from under fan plenum 38 to replace the collector when a different powder color is to be sprayed or the filter cartridges need replacing. That is, powder collector 24 can be rolled under the fan plenum assembly 38, without interference with seal 102 in the retracted position. After collector 24 is positioned so that both its inlet and exhaust openings 30 and 36, respectively, are aligned with fan support opening 82 and fan plenum assembly inlet opening 42, respectively, collector 24 is secured in place with the latch mechanism, as previously discussed, to provide an air tight seal between exhaust opening 28 through the side wall of canopy 14 and inlet opening 30 into powder collector 24. The seal assembly 100 is then inflated into the expanded position shown in FIG. 9 to compress seal 102 against the collector's top plate 34 to form an air tight seal between exhaust opening 36 and air plenum inlet opening 42. The pneumatic seal exerts a downward force on powder collector 24 and presses the collector against the floor or support surface to secure the collector 24 in position. Thus, even if collector 24 is inadvertently unlatched, it is still secured with respect to the fan plenum because of the downward force from seal assembly 100. When collector 24 is to be withdrawn from under fan plenum 38, the seal is deflated so that it contracts to its normal deflated condition, as illustrated in FIG. 8, so as not to interfere with the movement of the collector.

A further advantage of inflatable seal 100 is that it can account to some degree for cases where top plate 34 of the collector 24 is not completely level with respect to the bottom of fan plenum 38. That is, when collector 24 and fan plenum 38 are not completely level and aligned with each other, a secure air tight seal can still exist between collector 24 and fan plenum 38 because pneumatic seal 100, being resilient, can compensate for some degree for misalignment. This is yet another means by which the present invention facilitates the quick and easy leveling and sealing of collector 24 with respect to fan plenum 38 and booth canopy 14.

Figure 11:
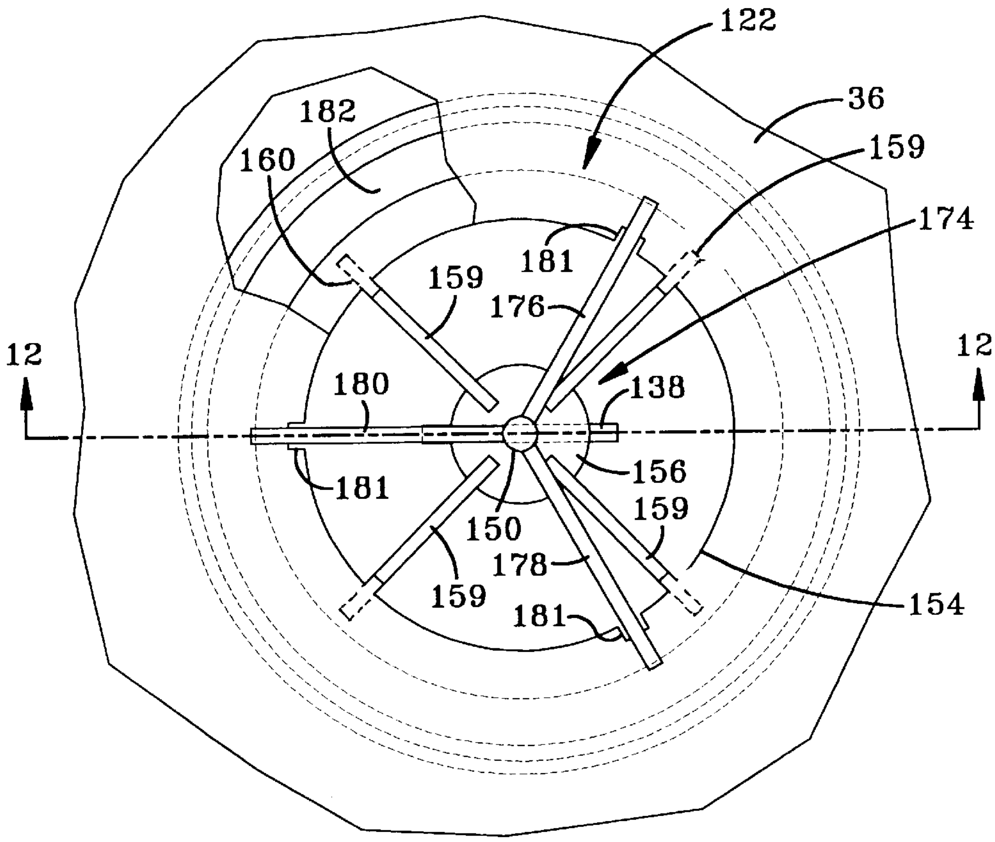
FIG. 11 is a top view of a filter cartridge assembly resting on the top of the powder collector.
Figure 12A:
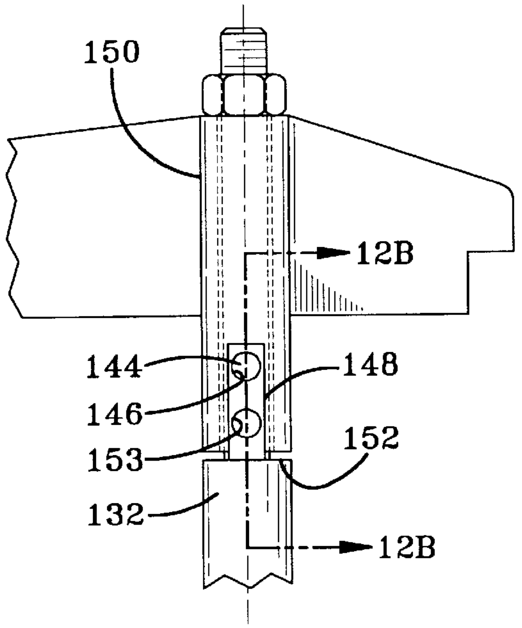
FIG. 12A is an enlarged section of FIG. 12.
Figure 12B:
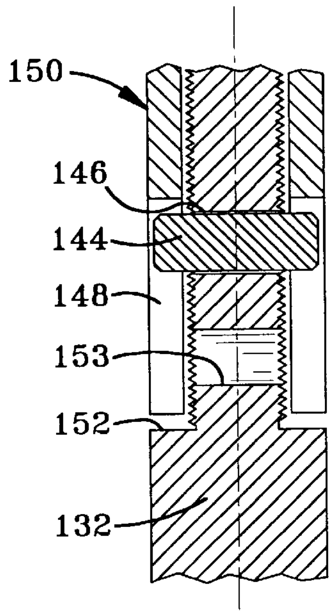
FIG. 12B is a view taken along line 12B—12B of FIG. 12A.
Figure 12:
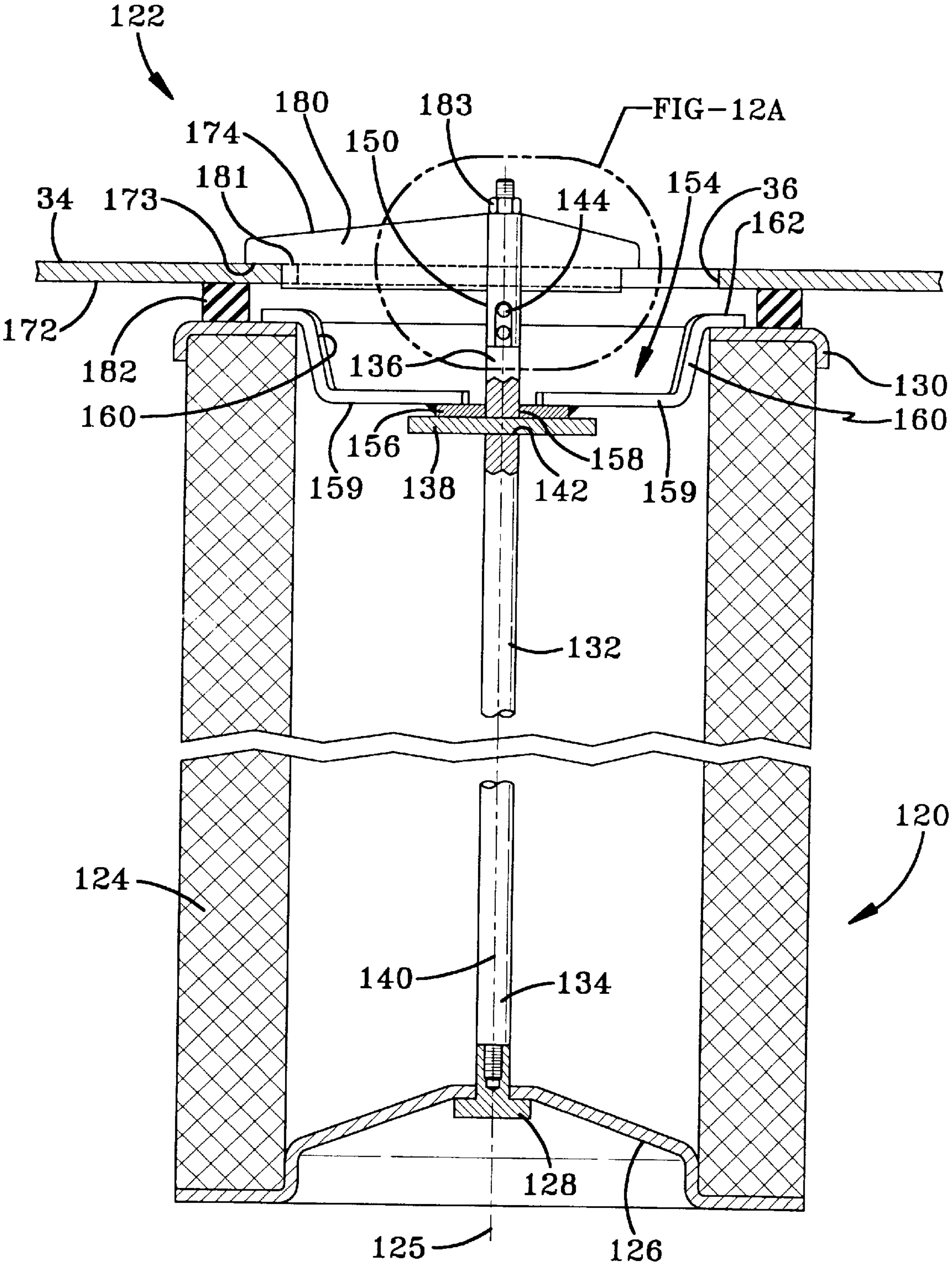
FIG. 12 is view taken along line 12—12 of FIG. 11 illustrating the filter cartridge and mounting assembly.

Another important feature of the present invention relates to the mounting of hollow, filter cartridges 120 to the top plate 34 of the powder collector 24, as generally illustrated in FIG. 1. The filters 120 are suspended from a support assembly 122, as explained in detail below. The filter cartridges 120, as illustrated in FIGS. 11 and 12, include an elongated hollow member 124 formed of a filter media, such as a cylindrically shaped, filtering wall with a pleated outer surface and a hollow interior disposed about a longitudinal centerline 125. The filter cartridge 120 has a closed bottom end cap 126 with an internally threaded boss 128 secured to the bottom end thereof and an open top end cap 130 secured to the top end thereof.

As illustrated in FIG. 12, a tie rod 132 is threaded at both ends 134 and 136 and extends through the hollow interior of filter cartridge 120. Tie rod 132 is threadably engaged at end 134 to threaded boss 128 and at the opposite end 136 to support assembly 122. Between ends 134 and 136 is a handle 138 extending transverse to a centerline 140 through the tie rod. In the preferred embodiment, the handle is secured by conventional means, such as a friction fit, in a bore 142 through rod 132. The handle enables an assembler to easily rotate the tie rod as it is threaded into or unthreaded from boss 128. A roll pin 144, located near the threaded portion of end 136, extends transversely to centerline 140 through tie rod 132 and is preferably secured in and projects outward from opposite ends of bore 146 through rod 132 (See FIGS. 12A & 12B). The roll pin 144 engages a cross slot 148 in a bushing 150 to prevent the rotation of tie rod 132 when the cartridge is being disassembled from the support 122, as discussed below. Note that roll pin 144 is located adjacent the shoulder 152 formed at the intersection of the threaded and unthreaded sections of tie rod 132. While a single roll pin is illustrated, an additional roll pin can be installed in bore 153 if desired.

A tie rod centering bracket 154, as seen in FIGS. 11 and 12, is formed of a circular plate 156 having a hole 158 through its center through which tie rod 132 is inserted. A plurality of radial extending arms 159, preferably four, are each attached by conventional means, such as spot welding, at one end to the plate 156 and have an upstanding leg 160 at the other end. The radial arms 159 are spaced at substantially 90 degrees with respect to each other. The upstanding legs 160 abut against the inner surface of the filter cartridge and prevent radial movement of the bracket. The free ends of the legs are bent to form a stop 162 which rests against the top end 130 of the cartridge to hold bracket 154 in place. Bracket 154 functions to center the tie rod within filter cartridge 120. That is, bracket 154 insures that the centerline 140 of the tie rod substantially coincides with the centerline 125 of cartridge 120. Maintaining alignment between the tie rod 132 and the centerline 125 of filter cartridge 120 during installation or removal of filter cartridge 120 prevents the boss 128 from breaking or the deforming of end cap 126.

Support assembly 122 is adapted to support a filter cartridge 120 below an opening 36 in the top plate 34 of powder collector 24 whereby the filter cartridge can be tightly sealed against the bottom side 172 of top plate 34. Support assembly 122 includes a spider assembly 174 having a center bushing 150 and a plurality of truss arms 176, 178 and 180 affixed thereto and projecting radially outward at an angle of about 120 degrees with respect to each other. The outer ends of the truss arms are notched so that an inner upstanding surface rests in a notch 181 extending radially outward from the periphery of opening 36, as seen in FIG. 11, to prevent rotational or radial movement of spider 174. The radial extending surface of the notch in the truss arms rests on the top surface of plate 34 and supports the cartridge within powder collector 24.

To assemble a filter cartridge 120 into the powder collector 24, tie rod 132 is threaded into the internal threaded boss 128, centering bracket 154 is inserted onto the rod 140 in filter cartridge 120, and filter cartridge 120 is placed in the powder collector through the inlet opening 30. The baffles, as illustrated in FIG. 10, are removed during this step so that the interior of collector 24 is completely open. Support assembly 122 is then secured across opening 36. The assembler then reaches into the opening 36 through the top plate 34 and holding handle 138 pulls up filter cartridge 120 so that the upper threaded end of rod 132 passes through bushing 150, with roll pin 144 inserted into slot 148 of bushing 150. The assembler pulls up on handle 138 until seal 182 of filter cartridge 120 rests against the bottom surface 172 of plate 34. Next, a nut 183 is secured to the upper threaded end of tie rod 132 and tightened, typically in a clockwise direction, to compress gasket 182 and seal cartridge 120 around inlet hole 36.

When the filter cartridge 120 is to be removed from the powder collector, the nut 183 is loosened, typically by turning in a counter clockwise direction. As the nut is turned, roll pin 144 engages slot 148 in bushing 150 to prevent tie rod 132 from turning and being unscrewed from the threaded boss 128.

While the above described embodiment of the invention provides an effective means of mounting of hollow, filter cartridges 120 to the top plate 34 of the powder collector 24, it relies on shoulder 152 of draw rod 132 to seat against bushing 150 which provides a positive stop corresponding to the desired compression of filter gasket 182. However, under some circumstances, filter gasket 182 is compressed more or less than desired because there is no means to compensate for variations in filter cartridge length caused by manufacturing tolerances or differences between filter vendors or variations in end cap depth. For example, when a rod 132 of a specific length is attached to some filter cartridges, the shoulder 152 of rod 132 does not always seat properly against center bushing 150 of spider assembly 174. This causes gasket 182 to under-compress or over-compress. Under-compression can cause powder leakage around the gasket 182 while over compression can result in failure of either spider assembly 174 or end cap 126.

Accordingly, it is within the terms of the invention to provide an alternative embodiment wherein a support assembly 200 is adapted to support filter cartridges 120' below openings 36' in the top plate 34' of powder collector 24' so that the gasket 182 between each cartridge 120' has an airtight seal against the bottom side 172' of top plate 34' irrespective of variations in the length of filter cartridges 120'. Throughout the specification, primed numbers represent structural elements which are substantially identical to structural elements represented by the same unprimed number.

Figure 13:
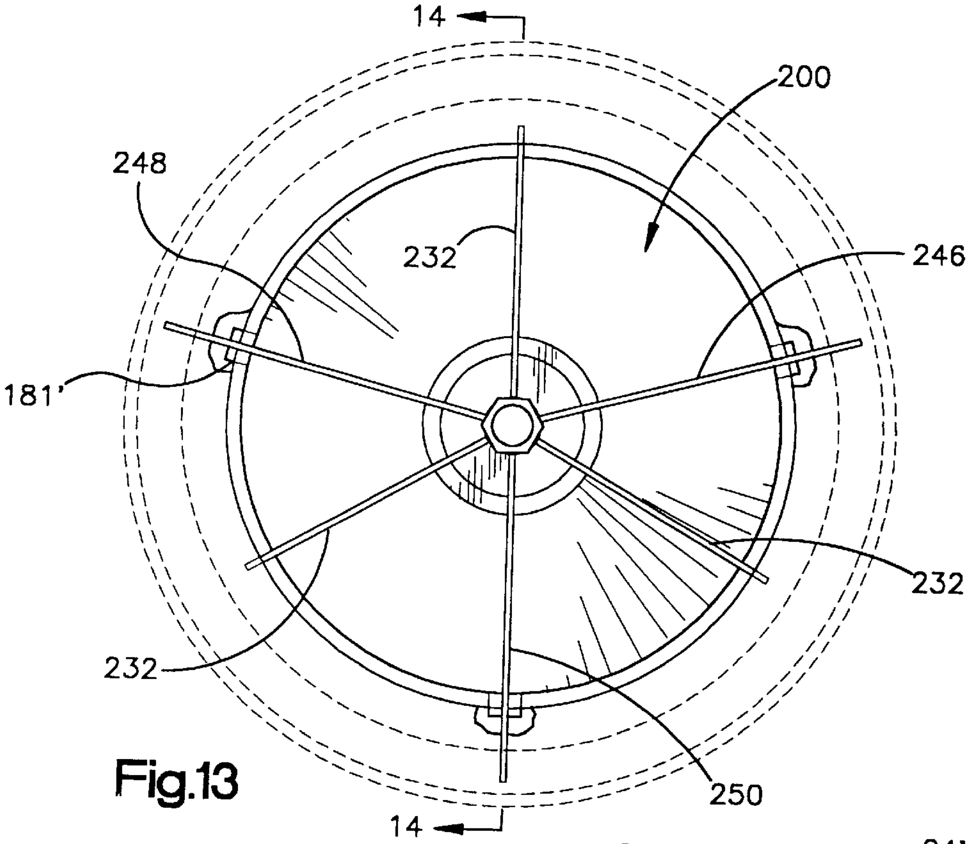
FIG. 13 is a top view of a second embodiment of a filter cartridge mounting assembly resting on the top of the powder collector.
Figure 14:
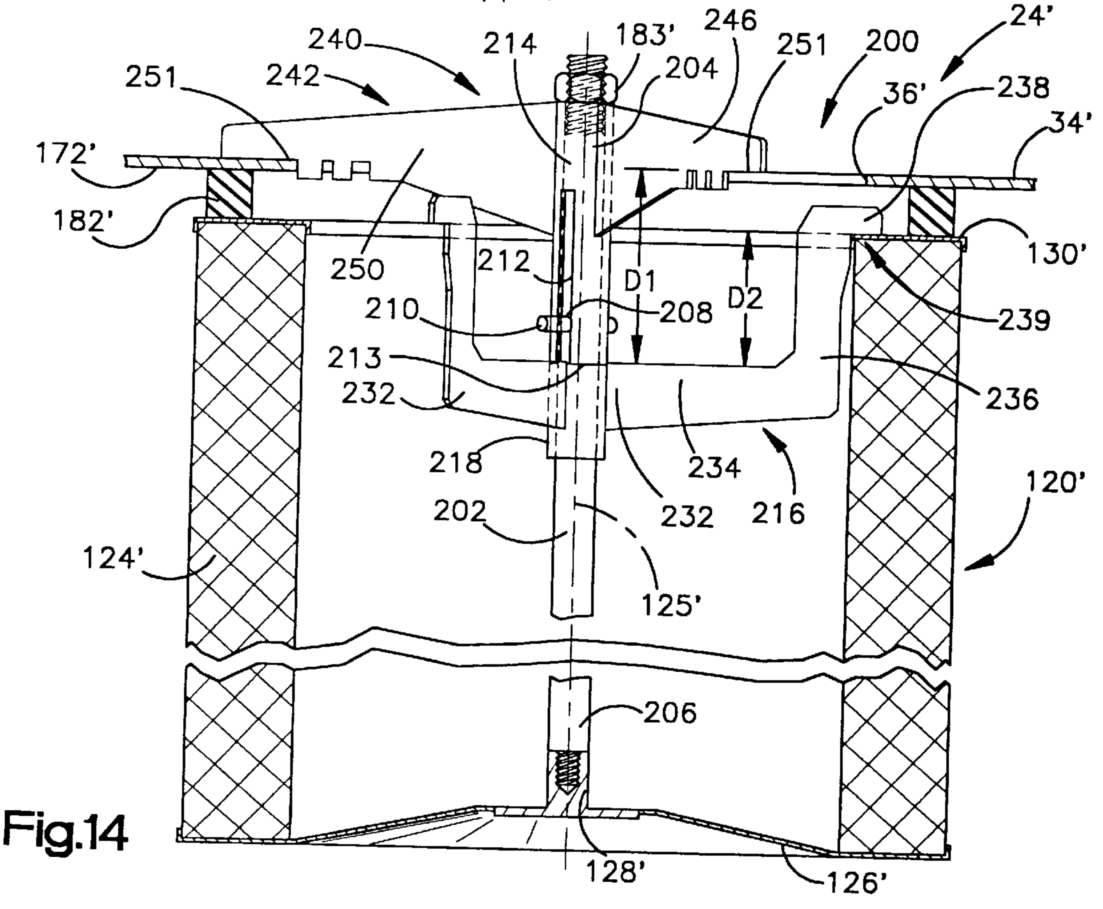
FIG. 14 is view taken along line 14—14 of FIG. 13 illustrating the second embodiment of the filter cartridge mounting assembly.

The alternative embodiment, as illustrated in FIGS. 13 and 14, includes a support assembly 200 from which a filter cartridge 120', as previously described and shown in FIG. 12, is suspended. Support assembly 200 insures that filter cartridge 120', irrespective of variations in its length, forms an airtight seal against top plate 34' with gasket 182' to insure leak free drawing of air through filter 120' into opening 36', as explained in detail below. Filter cartridge 120', as previously discussed, includes an elongated hollow member 124' formed of a filter media, a closed bottom end cap 126' with an internally threaded boss 128' secured to the bottom end thereof, and an opened top, end cap 130' secured to the top end thereof.

As illustrated in FIG. 14, a tie rod 202 which is threaded at both ends 204 and 206 extends through the hollow interior of filter cartridge 120'. Tie rod 202 is threadably engaged at end 204 to threaded boss 128' and at the opposite end 206 to support assembly 200. Between ends 204 and 206, is a transverse bore 208 in which a rod-shaped handle 210 is secured by conventional means such as a friction fit. Handle 210 enables an assembler to easily rotate tie rod 202 and thread it into or unthread it from boss 128'. Handle 210 is received in a cross slot 212 through bushing 214. Cross slot 212 opens at the lower surface 213 of bushing 214 and engages handle 210 to prevent tie rod 202 from rotating when filter cartridge 120' is being disassembled from support 200, as discussed below.

Tie rod centering bracket 216 includes a cylindrical tube 218 into which tie rod 202 is inserted. A plurality of radial extending arms 232, are securely fastened, by conventional means such as welding, to cylindrical tube 218. While three arms 232 are shown as being spaced substantially 120 degrees with respect to each other, it is within the terms of the invention to provide additional arms at different angles with respect to each other. Each arm 232 has a first section 234 which extends transversely outward from rod 202, a second section 236 which is bent upwards for a predetermined distance $D_2$, and a third section 238 which is bent at an angle to second section 236 so that it extends substantially parallel to first section 234. The lower surface 239 of third section 238 rests against end cap 130' of filter cartridge 120' to hold bracket 216 in place. Bracket 216 functions to center tie rod 202 within filter 120'. That is, bracket 216 insures that the centerline of tie rod 202 substantially coincides with centerline 125' of cartridge 120'. This relationship between these two centerlines prevents tie rod 202 from moving out of alignment with the centerline 125' of cartridge 120' during installation or removal of cartridge 120' and boss 128' from breaking or end cap 126' from deforming.

A support assembly 240 supports filter cartridge 120' below opening 36' in top plate 34' of powder collector 24' and enables cartridge 120' to be tightly sealed against bottom side 172' of top plate 34'. Support assembly 240 includes a spider assembly 242 having a center bushing 214 and a plurality of truss arms 246, 248, and 250 affixed thereto. Establishing a predetermined difference between the distance $D_1$ between the lower surface 251 of truss arms 246, 248, and 250 and the lower surface 213 of bushing 214, and the distance $D_2$ between the upper surface of arm section 234 and the top of the cartridge, insures that gasket 182' is compressed the correct amount, as discussed below. Truss arms 246, 248, and 250 (246–250) project radially outward and are spaced with two arms 246 and 248 at an angle of about 150 degrees from each other and the other arm 250 at an angle of about 105 degrees to arms 246 and 248. The larger angle enables an assembler to easily insert his hand between truss arms 246 and 248 and grab handle 210. The outer ends of the truss arms 246, 248, and 250 have one or more notches 251 so that an inner upstanding surface rests in a notch 181' extending radially outward from the periphery of opening 36', as seen in FIG. 13, to prevent rotational or radial movement of spider assembly 242. The radial extending surface of notch 251 in truss arms 246–250 rests on the top surface of plate 34' and supports cartridge 120' within powder collector 24'.

To mount a cartridge 120' into powder collector 24', tie rod 202 is inserted through cylindrical tube 218 of centering bracket 216, and then threaded into internal threaded boss 128'. Next cartridge 120' is inserted into powder collector 24' through inlet opening 30. The baffles, shown in FIG. 10, can be removed during this step so that the interior of collector 24' is completely open. Support assembly 240 is then secured across opening 36'. The assembler then reaches into the opening 36' through the top plate 34' and holding handle 210 pulls up cartridge 120' so that the upper threaded end of rod 202 passes through bushing 214 and pulls cartridge 120' upward so that handle 210 is received in cross slot 212 and seal 182' on cartridge 120' rests against the bottom surface 172' of plate 34'. Next, a washer and a lockwasher (neither shown) can be inserted on the tie rod and a nut 183' is threaded onto the upper threaded end of tie rod 202 and tightened until lower surface 213 of bushing 214 abuts securely against the upper surface of cylindrical tube 218. This results in gasket 182' being compressed a predetermined amount, i.e. corresponding to the difference between $D_2$ and $D_1$, to form an air tight seal around inlet hole 36' between cartridge 120' and top plate 34' without damaging spider assembly 242 or end cap 126'. Slot 212 is long enough to allow draw rod 202 several inches of movement so that gasket 182' can be compressed the desired amount, i.e. the difference between $D_2$ and $D_1$, irrespective of variations in the length of cartridge 120' or variations in the depth of end cap 128'.

To remove cartridge 120' from the powder collector, nut 183' is initially unthreaded from rod 202 by turning in a counterclockwise direction. As nut 183' is being turned, handle 210 engages cross slot 212 in bushing 214 and prevents rod 202 from turning and disengaging, i.e. being unthreaded, from threaded boss 128'.

While the nut 183 and 183' as illustrated in FIGS. 12 and 14, typically with a washer and lockwasher (neither shown), can effectively secure the cartridge in place, the installation of the cartridge into the powder collector can be cumbersome for one person because the filter has to be held while the shaft is aligned and the nut started. In some instances the nut with the washer and lockwasher drop into the collector or the filter.

Figure 15:
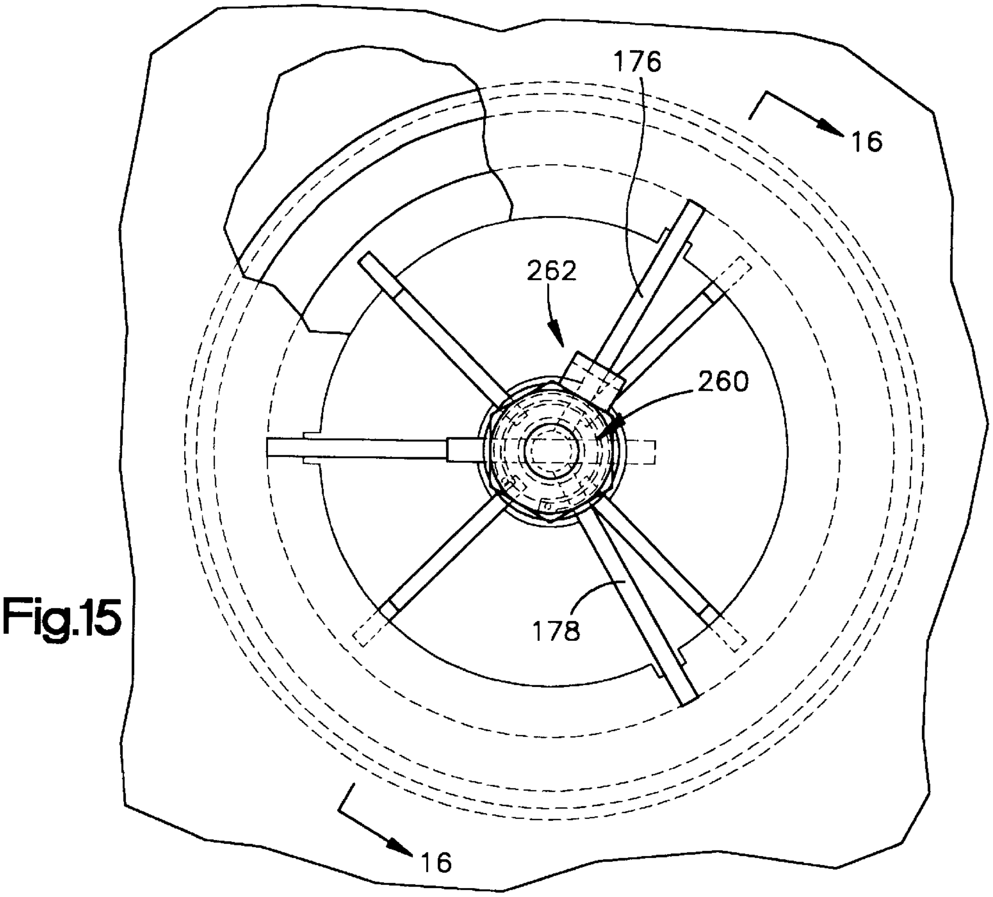
FIG. 15 is a top view of a third embodiment of a filter cartridge mounting assembly resting on the top of the powder collector.
Figure 16:
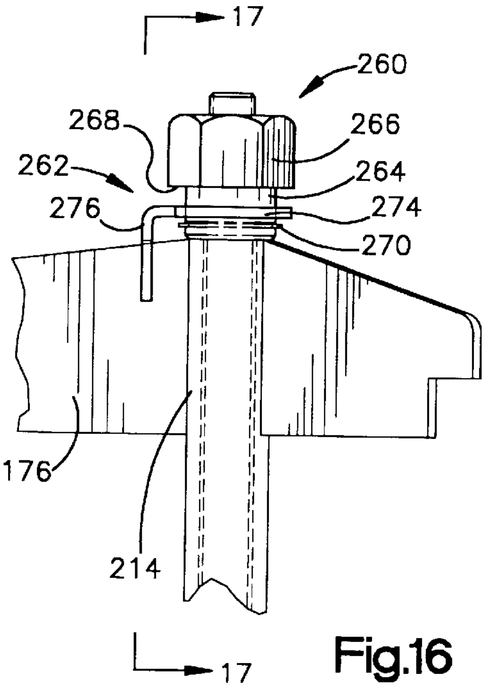
FIG. 16 is view taken along line 16—16 of FIG. 15 illustrating the third embodiment of the filter cartridge mounting assembly.
Figure 17:
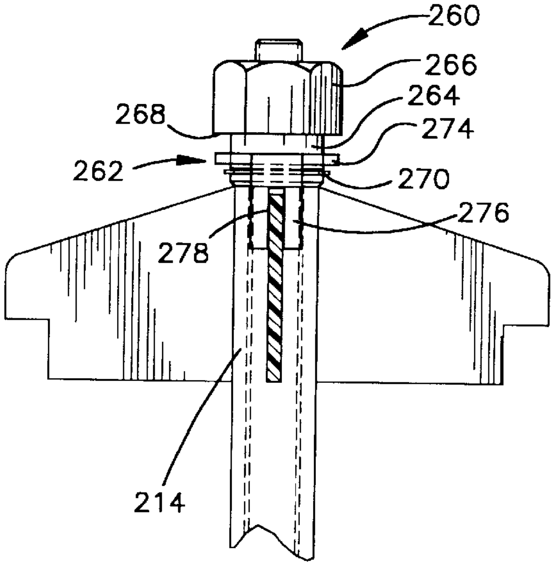
FIG. 17 is view taken along line 17—17 of FIG. 16.

In an alternative embodiment, as illustrated in FIGS. 15, 16 and 17, a nut 260 captured in an L-shaped bracket 262 replaces nut 183. Nut 260 has a barrel shaped first section 264 and a multi-sided, second section 266, typically having between four and eight sides and preferably six sides. First section 264 has an outer diameter which is less than the nominal diameter of second section 266. A shoulder 268 is formed at the intersection of the first and second sections 264 and 266, respectively. An annular groove is formed on the lower end of section 264 and receives a “c” shaped spring clip 270.

The L-shaped bracket 262 is formed of a circular body 274 having a opening therethrough and a leg 276 which projects downward from one side of circular body 274, the leg 276 has a slot 278, as shown in FIG. 17, therethrough. Bracket 262 is attached to one of the truss arms, such as arm 176, by inserting the edge of the truss arm into slot 278 through leg 276. Preferably, bracket 262 is secured to arm 176 by conventional means such as welding along the intersection between the edges of slot 278 and the truss arm.

To assemble the captured nut 260 and L-shaped bracket 262, the barrel shaped first section 264 is initially inserted into the opening through circular body 274 and abutted against shoulder 268. Spring clip 270 is snapped into place in the cylindrical groove on the barrel shaped first section 264. Since the nut 260 is secured to bracket 262 which is secured to truss arm 176, it cannot accidentally drop into the filter or powder collector as the upper threaded end of tie rod 202 is threaded into nut 260. The length of barrel shaped section 264 is long enough to insure that when nut 260 is tightened against center bushing 214, a space between spring clip 270 and shoulder 268 prevents any load from being exerted against bracket 262.

An important aspect of the invention relates to the construction of novel filter cartridges 120 wherein a closed bottom end cap 126 is provided with internally threaded boss 128 secured by any conventional means, such as welding, to the bottom end thereof. This construction allows filters 120 to be quickly and easily installed and/or removed from collector 24.

The patents listed herein are intended to be incorporated by reference in their entireties.

It is apparent that there has been provided in accordance with this invention apparatus and methods for sealing a powder collector assembly against a spray booth and a fan plenum assembly and a cartridge mount assembly that satisfy the objects, means and advantages set forth hereinbefore. According to the invention, a powder spray canopy is aligned with a fan plenum assembly by a fan support bracket which is itself supported by the base which supports the canopy so that a powder collector can be quickly aligned and securely sealed to both the powder spray canopy and the fan assembly. A pneumatic seal is provided between the fan plenum and collector to facilitate this operation. A support assembly is provide for the filter cartridges which enables an assembler to easily and quickly install and remove the filter cartridge as needed from the powder collector.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

We claim:

1. A filter cartridge mount assembly, comprising:

a hollow filter cartridge having a bottom plate secured to a bottom end of said filter cartridge and a top end cap secured to a top end of said filter cartridge, said bottom plate having an internally threaded boss;

a tie rod extending through said filter cartridge and threadably engaged at one end to said threaded boss and at an opposite end to a support assembly, the tie rod having a handle extending therethrough within the filter cartridge; and said support assembly being above the top end of said filter cartridge and supported in an opening through a top wall of a powder collector whereby said filter cartridge is secured against said top wall of said powder collector.

2. The apparatus of claim 1 wherein said support assembly includes a spider assembly constructed of a hollow bushing through which said tie rod is inserted, said spider assembly including a plurality of truss arms projecting radially outward from said hollow bushing and adapted to rest on said top wall about the periphery of said opening in said top wall of said powder collector.

3. The apparatus of claim 2 further including notches in said top plate extending radially outward from said periphery of said opening for engaging said truss arms to prevent rotational or radial movement of said spider assembly.

4. The apparatus of claim 3 further including a roll pin extending through said tie rod to engage a slot through said hollow bushing to prevent said tie rod from being unthreaded from said threaded boss when said cartridge is removed from said powder collector.

5. The apparatus of claim 1 further including a centering bracket having a hole therethrough and said tie rod inserted through said hole to engage the interior wall of said filter cartridge and maintain a centerline of said tie rod substantially coincident with a centerline through said cartridge.

6. A filter cartridge and mount assembly, comprising:

a hollow filter cartridge having a closed bottom and an open top;

a tie rod extending through the filter cartridge; and a handle secured to the tie rod within the interior of said filter cartridge, said tie rod having one end attached to said bottom of said filter cartridge and a second end above the open top wherein said which handle can be grasped by an operator to pull up on said filter cartridge from the interior thereof when installing said filter cartridge in a collector.

7. A filter cartridge mount assembly adapted to mount a hollow filter cartridge having a bottom plate and a top end cap secured to a top end of said filter cartridge to an exhaust outlet opening of a powder collector, comprising:

a support assembly including a hollow bushing with a cross slot therethrough and a plurality of truss arms affixed to said hollow bushing and projecting radially outward therefrom to removably attach said support assembly to the periphery of said outlet opening;

a tie rod having a handle therethrough, said tie rod extending through said cartridge and having a first end secured to said bottom plate and an opposite second end supported by said support assembly above the top end of said filter cartridge;

a centering bracket having a cylindrical tube with a hole therethrough, said tie rod extending through said hole, said centering bracket adapted to engage said cartridge whereby said hollow bushing of said support assembly and said cylindrical tube of said centering bracket abut against each other to compress a gasket between said filter cartridge and said exhaust outlet opening within said powder collector to form an air tight seal between said filter cartridge and said powder collector.

8. The filter cartridge mount assembly of claim 7 further including notches in said top plate extending radially outward from the periphery of said opening to engage said truss arms and prevent rotational or radial movement of said support assembly.

9. The filter cartridge mount assembly of claim 7 wherein said handle extend through said tie rod being received within said cross slot of said hollow bushing to prevent said tie rod from being disengaged from said bottom plate when said cartridge is removed from said powder collector.

10. The filter cartridge mount assembly of claim 7 further including a threaded nut to threadably engage said second end of said tie rod to secure said tie rod to said support assembly.

11. The filter cartridge mount assembly of claim 10 further including;

a bracket secured to said support assembly; and said threaded nut rotatably secured to said bracket.

12. The filter cartridge mount assembly of claim 11 further including:

said threaded nut having a barrel shaped first section and a multi-sided, second section; and a clip for securing said threaded nut to said bracket after said barrel shaped first section has been inserted into an opening through said bracket whereby said threaded nut can turn in either the clockwise or counterclockwise direction.

* * * * *